(12) United States Patent  
Parent et al.

(10) Patent No.: US 8,728,401 B2  
(45) Date of Patent: May 20, 2014

(54) FILTER BAG, PLEATABLE FILTRATION MATERIAL THEREFORE, AND PROCESS OF MAKING SAME

(75) Inventors: Luc Parent, Saguenay (CA); Sylvain Vieuille, Gemil (FR)

(73) Assignee: Sefar BDH, Inc., Saguenay, QC (CA)

( * ) Notice: Subject to any disclaimer, the term of this patent is extended or adjusted under 35 U.S.C. 154(b) by 338 days.

(21) Appl. No.: 13/126,130

(22) PCT Filed: Oct. 26, 2009

(86) PCT No.: PCT/CA2009/001539
§ 371 (c)(1),
(2), (4) Date: Apr. 26, 2011

(87) PCT Pub. No.: WO2010/048709
PCT Pub. Date: May 6, 2010

(65) Prior Publication Data
US 2011/0206564 A1 Aug. 25, 2011
US 2012/0034134 A2 Feb. 9, 2012

Related U.S. Application Data

(60) Provisional application No. 61/108,619, filed on Oct. 27, 2008, provisional application No. 61/152,420, filed on Feb. 13, 2009.

(51) Int. Cl.
*B01D 53/34* (2006.01)
*B01D 46/00* (2006.01)

(52) U.S. Cl.
USPC ............ 422/177; 422/168; 422/180; 55/382; 55/486; 55/487; 28/104

(58) Field of Classification Search
USPC ............ 422/168, 177, 180; 55/382, 486, 487; 28/104
See application file for complete search history.

(56) References Cited

U.S. PATENT DOCUMENTS

| 4,612,237 A | * | 9/1986 | Frankenburg | ................. 428/219 |
| 4,878,930 A | | 11/1989 | Manniso et al. | |
| 4,983,434 A | * | 1/1991 | Sassa | .......................... 428/36.2 |
| 5,792,242 A | | 8/1998 | Haskett | |

(Continued)

FOREIGN PATENT DOCUMENTS

| JP | 58-177552 | 11/1983 |
| JP | 09-313827 A | 12/1997 |

(Continued)

OTHER PUBLICATIONS

International Search Report and Written Opinion issued in PCT/CA2009/001539 dated Dec. 17, 2009.

*Primary Examiner* — Lessanework Seifu
(74) *Attorney, Agent, or Firm* — Scott A. Felder; Wiley Rein LLP

(57) ABSTRACT

The pleated filter bag, which can be used in a bag-house type dust collector, is elongated and has a longitudinal hollow center with an open end, and a pleated filter wall circumscribing the hollow center. The pleated filter wall has a felt such as PTFE fibers felted onto an apertured and pleatable scrim which can be made of metal, and having a permeability lower than a permeability of the scrim. A membrane of lower-permeability material, such as an E-PTFE membrane, covers the support felt on the outer side of the bag.

17 Claims, 1 Drawing Sheet

(56) References Cited

U.S. PATENT DOCUMENTS

| | | | |
|---|---|---|---|
| 5,843,390 A * | 12/1998 | Plinke et al. ............... 423/239.1 |
| 5,928,414 A | 7/1999 | Wnenchak et al. |
| 5,993,501 A | 11/1999 | Cusick et al. |
| 6,008,146 A | 12/1999 | Stark |
| 6,123,751 A | 9/2000 | Nelson et al. |
| 6,372,004 B1 | 4/2002 | Schultink et al. |
| 6,454,834 B1 | 9/2002 | Livingstone et al. |
| 6,579,350 B2 | 6/2003 | Doherty |
| 6,746,517 B2 | 6/2004 | Benson et al. |
| 6,752,847 B2 | 6/2004 | Smithies |
| 6,857,525 B2 * | 2/2005 | Parent ............... 210/457 |
| 7,008,465 B2 | 3/2006 | Graham et al. |
| 7,094,270 B2 | 8/2006 | Schultink et al. |
| 7,208,026 B2 | 4/2007 | Ohya et al. |
| 7,247,585 B2 | 7/2007 | Bascom et al. |
| 7,374,796 B2 | 5/2008 | Smithies |
| 2006/0089067 A1 | 4/2006 | Baker, Jr. et al. |
| 2006/0137318 A1 | 6/2006 | Lim et al. |
| 2007/0084787 A1 | 4/2007 | Gross et al. |
| 2007/0289920 A1 | 12/2007 | Baker, Jr. et al. |

FOREIGN PATENT DOCUMENTS

| | | |
|---|---|---|
| JP | 03-068409 A | 3/2003 |
| JP | 2005281904 | 10/2005 |
| JP | 60-086432 A | 10/2007 |
| JP | 2008119614 | 5/2008 |
| WO | 01/62365 A1 | 8/2001 |
| WO | 2010/048709 A1 | 5/2010 |

* cited by examiner

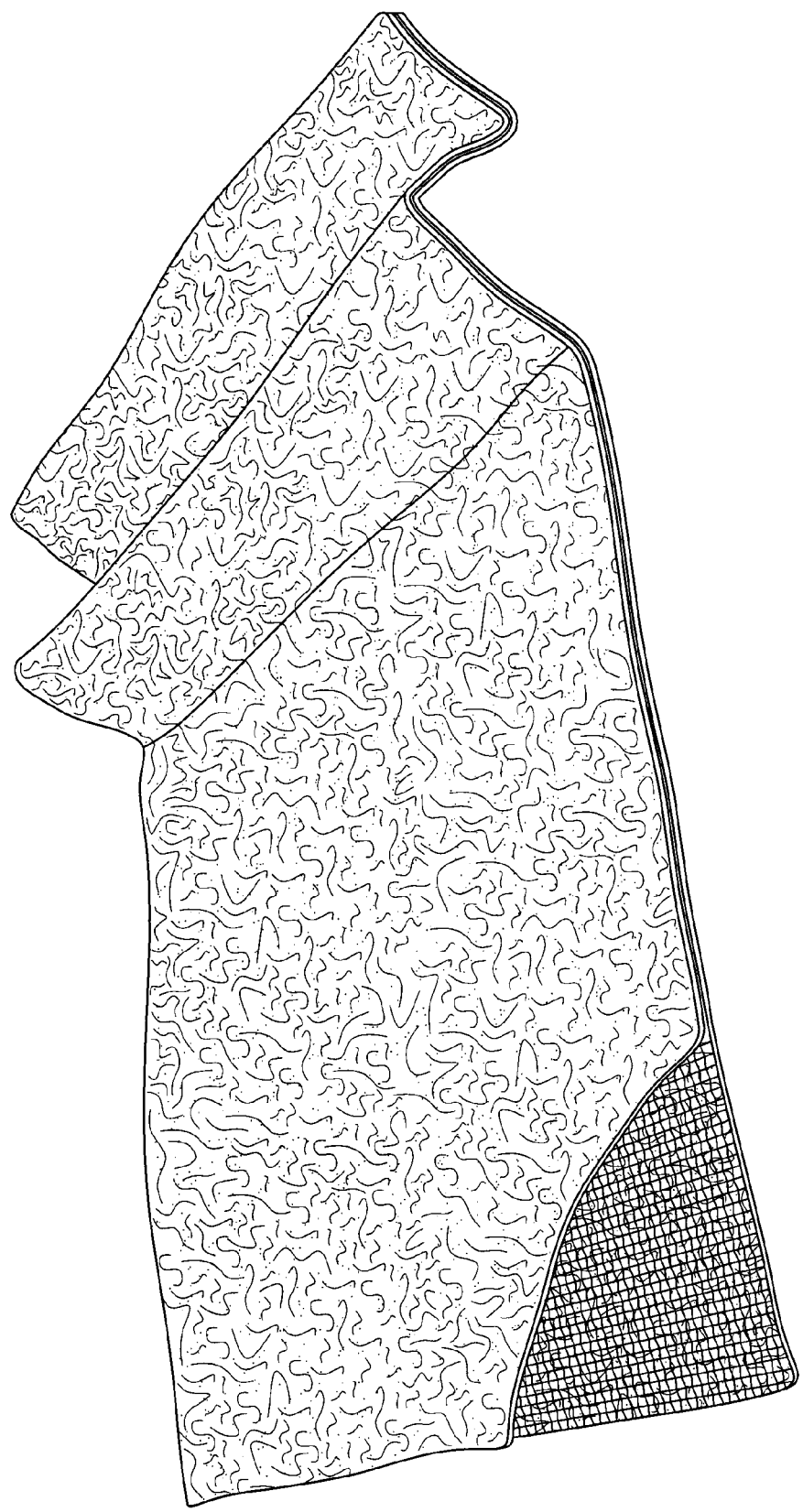

FILTER BAG, PLEATABLE FILTRATION MATERIAL THEREFORE, AND PROCESS OF MAKING SAME

CROSS-REFERENCE TO RELATED APPLICATIONS

This application is a national stage filing under 35 U.S.C. §371 based upon international application no. PCT/CA2009/001539, filed 26 Oct. 2009 and published in English on 6 May 2010 under international publication no. WO 2010/048709, which claims priority to U.S. provisional application nos. 61/108,619, filed 27 Oct. 2008 and 61/152,420, filed 13 Feb. 2009. All of the foregoing are hereby incorporated by reference as though fully set forth herein.

FIELD

The specification relates to pleatable materials, or fabrics, for use in filtration, and more particularly for use as pleated "filter bags" in baghouse-type dust collectors, for example.

BACKGROUND

A dust collector is an equipment to remove particles in an industrial fume. Typically the collector contains between hundreds to thousands of cylindrical elements referred to as bags. The bags are made of a filtration fabric that is porous. As the gas flows through, the porous filtration fabric collects particles. The particles can form a cake on the surface after minutes of operation, and the bags are typically cleaned by a reversed jet.

One of the important parameters of the filtration fabric is the filtration efficiency. The efficiency of filtration of bags is related to the total surface area. Typically, if the surface area is increased, then the velocity of gas and particles going through the fabric will be reduced, which decreases the probability of undesired particles going through the fabric and can consequently reduces the particle emissions. Moreover, a higher surface area can reduce the probability of particles getting embedded into the fabric in a manner where they resist the reversed jet, thereby increasing the lifespan of the filter. It is also possible, by increasing the surface area, to increase the capacity of a dust collector. It is thus generally sought to increase the surface area of the bags in dust collectors, where possible.

Typically, pleated bags have a greater surface area than non-pleated bags (i.e. simply cylindrical bags). Using pleated bags instead of non-pleated bags is thus one way of increasing the surface area without necessarily increasing the overall size of the dust collector system. In many cases, replacement of non-pleated bags by pleated bags can increase the surface area by two to three times.

Pleated bags can be made using a pleatable material which keeps its shape after pleating. The pleating can be done with a pleating machine. Some pleating machines operate at room temperature.

Alternately, for some materials which require thermosetting to retain their pleats, pleating machines having heating blades are used to fold the fabric and keep pressure on the pleats until the fabric is cooled back to room temperature. Heretofore, such processes have been used with polymers that can be thermally formed and have a relatively small density.

Some materials that are not thermally formable per se can be made so by adding a thermo-setting resin. An example of this is fiberglass felt impregnated with phenolic resin. The temperature of blades allow setting of the phenolic resin which subsequently acts to maintain the shape of the pleats. The reaction being irreversible, the pleats subsequently keep their shape even at high temperature.

However, even given the state of the art, some filtration materials could not be pleated by the known means and therefore remained known as being unpleatable. Nevertheless, given some desired characteristics, at least one of these 'unpleatable' filtration materials remained a popular choice for some specific applications despite the fact that it was not available in pleated form. There thus remained a strong need for an equivalent to such 'unpleatable' materials in pleated form due to the many advantages of pleats in filtration. This called for improvement.

SUMMARY

As it will appear from the description below, a filtration material such as a PTFE felt covered by an E-PTFE membrane, which was traditionally known as unpleatable, can now be made pleatable by felting with a pleatable scrim, more particularly a pleatable metallic scrim. There are many metals which are pleatable when provided in apertured sheets, and the pleatability of a metallic scrim can take precedence on the pleatability of both the felted PTFE and the E-PTFE membrane. Felting by hydro-entanglement (spunlacing) can be better suited than needle-felting when using a metallic scrim.

In accordance with one aspect, there is provided a pleatable filtration material comprising a felt having PTFE fibers felted onto a pleatable metallic scrim, a permeability of at least 20 $l/dm^2$/minute at 12 mm of water gauge and a weight between 100 and 1000 g/m2, the felt having a density between 150 and 1000 $g/m^2$ and a permeability greater than that of the scrim and between 20 and 250 $l/dm^2$/minute at 12 mm of water gauge; and a membrane laminated onto the felt, made of E-PTFE and having a permeability of between 3 and 75 $l/dm^2$/minute at 12 mm of water gauge, preferably between 12 and 50 $l/dm^2$/minute at 12 mm of water gauge; wherein the filtration material can be pleated using a traditional pleater at room temperature and thenceforth retain its pleats.

In accordance with one aspect, there is provided a process of making a pleatable filtration material comprising felting PTFE fibers onto a pleatable metallic scrim having resistance characteristics at least comparable to that of the PTFE fibers, a permeability of at least 20 $l/dm^2$/minute at 12 mm of water gauge and a weight between 100 and 1000 g/m2, until a felt density between 150 and 1000 $g/m^2$ in addition to the density of the scrim and a permeability greater than that of the scrim and between 20 and 250 $l/dm^2$/minute at 12 mm of water gauge are reached; and laminating an E-PTFE membrane having a permeability of between 3 and 75 $l/dm^2$/minute at 12 mm of water gauge, preferably between 12 and 50 $l/dm^2$/minute at 12 mm of water gauge onto a face of the felted PTFE fibers.

In accordance with one aspect, there is provided a pleated filter bag for use in a bag house dust collector, the filter bag being elongated and comprising a longitudinal hollow center with an open end, and a pleated filter wall transversally circumscribing the hollow center, the pleated filter wall having a felt felted onto an apertured and pleatable scrim and having a permeability lower than a permeability of the scrim and appropriate for filtration applications, and a membrane having a permeability substantially lower than the permeability of the felt and covering the felt on the outer side thereof facing the hollow center, wherein all of the scrim, the felt, and the membrane are resistant to a harsh filtration environment of the dust collector.

In accordance with another aspect, there is provided a filter fabric construction which incorporates a pleatable scrim to the base felt. The pleatability of the scrim takes precedence on the pleatability of the remaining components of the filter fabric, thereby rendering the filter fabric pleatable. This construction, or associated production method, can make pleatable a material such as PTFE, which was traditionally known as non-pleatable.

In accordance with another aspect, there is provided a pleatable filtration fabric having an E-PTFE laminated PTFE felt. This filtration fabric is made pleatable while at least substantially maintaining the thermal and chemical resistance characteristics of the PTFE by making the PTFE felt with a pleatable, heat-resistant and chemical-resistant scrim. The pleatability of the metallic scrim takes precedence in the combination and makes the entire material pleatable.

It will be understood that in the instant specification, the expression "pleatable" is to be understood in the context of operability in filtration. A pleatable filtration element will retain its pleats for a reasonable lifespan in the context of a normal or recommended use. For instance, a felt of polyester with a polyester scrim can be viewed as a non-pleatable fabric, whereas spunbounded polyester, which is denser and stiffer, can be viewed as pleatable.

DESCRIPTION OF THE FIGURES

In the appended figures,

FIG. 1 is a perspective view, fragmented, showing an example of a felt having a pleatable scrim.

DETAILED DESCRIPTION

One example of a material which was still used in unpleated form is polytetrafluoroethylene (PTFE), at least partly because of its exceptional thermal and chemical resistance characteristics which made the only viable choice for some harsh environments. An example of an application where unpleated PTFE-based bags were still used is dust collectors of waste incineration facilities. Incinerated wastes typically contain plastics which emit aggressive chemicals such as HCl, H2SO4, and HF during combustion. PTFE was appreciated for resisting to the combination of high temperatures (~150 to 260° C.) and aggressive chemicals present in such waste incineration gaseous by-products. In applications such as waste incineration where tolerated emission levels were quite low, the PTFE fabric can be covered by a membrane to get a more efficient degree of filtration. A porous expanded PTFE membrane (E-PTFE) can be used to this end, laminated on the PTFE felt.

Tests attempting to pleat a PTFE felt (with or without catalyst) with a PTFE scrim failed. After pleating, the shape was not kept in a satisfactory way. Further, adding resins to the PTFE was found inefficient, at least partly due to the lack of adhesion and wetting by many of the tested resins on PTFE fibers.

The mere continued use of non-pleated PTFE filtration bags in dust collectors of applications such as waste incineration facilities, in itself demonstrates the former unavailability of this material in pleated form, considering the strong incentives for using pleated bags instead of cylindrical bags.

As will be detailed below, it will be understood how such materials and others can now be pleatable by felting the fabric onto a pleatable scrim. A type of pleatable scrim which can be used in making a PTFE felt pleatable is a metallic scrim.

FIG. 1 shows an exemplary sample of a PTFE felt spunlaced onto a metallic scrim. In this example, the metallic scrim is a square steel screen. As shown in the cut-out portion on the bottom and left-hand side corner of the sample, the metallic scrim is sandwiched between two layers of PTFE felt. In fact, during hydro-entanglement of the PTFE fibers, the fibers are placed on one side of the scrim, and partially pass through it, to the other side. The right-hand side of the sample is shown pleated. The E-PTFE membrane (not shown in the illustration), can later be laminated onto one face of the PTFE felt with metallic scrim. The PTFE felt can act as a support layer for the E-PTFE membrane which has a permeability substantially lower than the permeability of the felt. In use, the E-PTFE membrane faces the outside of the filtration bag and determines the relatively low permeability of the filtration material. The felt can thus be used to provide a cushioned support to the membrane, and, in combination with the metallic scrim, gives mechanical resistance to the membrane which acts as the actual "filter" during use but which is not practically usable alone. In fact, in many applications, the stresses which would be imparted to the E-PTFE membrane by the scrim during use if it was adhered directly thereto instead of being supported via felt, would result in an E-PTFE membrane having a very short useful life. The metallic scrim additionally provides pleatability to the filtration material because its higher pleatability takes precedence in the assembly.

The felt can be made of expanded porous or non-expanded PTFE fibers. The felt can be made by spunlacing the fibers onto the metallic scrim by a water jet—a process commonly referred to as hydro-entanglement. Hydro-entanglement can allow to avoid or reduce damage to the metallic scrim which could result if using conventional needle felting instead. The felt can have a density between 150 and 1000 g/m$^2$, preferably between 250 and 700 g/m$^2$, and a permeability between 20 and 250 l/dm$^2$/minute at 12 mm of water gauge, preferably above 100 l/dm$^2$/minute, for example.

The metallic scrim can be made of galvanized steel, stainless steel, aluminum, aluminium alloy, bronze, brass, copper, copper-based alloy, nickel, nickel-based alloy, or any suitable metal or alloy, provided it has suitable pleatability and resistance, and that it is ductile enough to be pleated without breaking. The metal can be a woven mesh, a punched metal sheet or any method that will create a metal sheet with suitable apertures in it. The permeability of the material should be greater than the permeability which is desired of the felt, preferably at least 20 l/dm$^2$/minute at 12 mm of water gauge. The weight of the metal scrim can be between 100 and 1000 g/m$^2$, preferably between 300 and 700 g/m$^2$ for example. Metallic scrims of various known types of metals can have chemical and temperature resistance characteristics suitable for harsh applications.

The felted support layer can be treated with a binder prior to lamination of the membrane, or the binder can be omitted. The fibers of the felt can act in a binding manner in certain applications. If used, the binder can be a fluorinated ethylene propylene copolymer (FEP) or a hexafluoropropylene-tetrafluoroethylene copolymer, for example, or any other suitable binder. The binder can be provided at a concentration of between 25-50% by weight in a liquid suspension, and be either sprayed on a selected side of the support layer or transferred thereon using a roll. The material can then be heated in an oven at ~120 to 240° C., to evaporate the solvent. After evaporation, the weight of transferred solid binder can represent a relative weight of between 1% and 10% (relative to the weight of the fabric).

The membrane, which can be made of commercially available E-PTFE, preferably has a permeability between 3 and 75 l/dm$^2$/minute at 12 mm of water gauge, more preferably between 12 and 50 l/dm$^2$/minute at 12 mm of water gauge. The membrane can be laminated on the side having the binder at a temperature of 270° C.

It will be noted that in some instances, PTFE felt for use in applications such as incinerators can have particles of catalyst deposited on the surface or embedded into the PTFE fibers.

This can be desirable in a pleatable fabric and typically does not affect pleatability. For example, some catalysts help reducing emissions of dioxin, furan or nitrous oxide from waste incineration. The catalyst typically is typically provided a volume less than 20% of the volume of the PTFE fibers. Examples of catalysts include titanium dioxide ($TiO_2$), iron and cobalt (provided in the form of oxides), nickel, platinum and palladium. Other examples of catalysts include zeolith, copper oxide, tungsten oxide, aluminum oxide, chromium oxide, gold, silver, rhodium etc. If used, the catalyst should be provided in a particles size of less than 10 microns, but can be of any suitable shape, such as spheres, whiskers, plates, flakes, etc.

A resulting pleatable filtration material, or fabric, can include PTFE fibers spunlaced to a steel scrim, covered by a membrane. Such a fabric can be pleated using a traditional pleater operating at room temperature. The use of a pleatable metallic scrim can render the use of heated pleater blades unnecessary. An exemplary embodiment thereof is provided below:

EXAMPLE 1

PTFE fibers are spunlaced onto a 400 g/m² stainless steel scrim by hydro-entanglement. After entangling the total weight is 800 g/m². The permeability of the material at this step is about 200 l/dm²/minute. The resulting felted support material is then sprayed with a suspension of FEP particles to add about 25 g/m of FEP particles after drying at 150° C. Then, an E-PTFE membrane is laminated thereon with the temperature of the FEP particles raised to 270° C. The resulting filtration material has a weight of 825 g/m², and a permeability between 15 and 30 l/dm²/minute at 12 mm of water gauge, and is pleatable at room temperature.

EXAMPLE 2

Titanium dioxide particles of less than 10 microns in size are mixed with a PTFE dispersion. The titanium dioxide can correspond to 1-90% by volume, preferably 25-85% by volume, for example. The paste is extruded and calendered to form a tape. The tape is slitted along the length, expanded and processed over a rotating pinwheel to form fibers. These fibers with catalyst on the surface are spunlaced onto a 500 g/m2 stainless steel 316 scrim by hydroentanglement. After entangling the total weight is 900 g/m2. The E-PTFE membrane is laminated directly on the surface of the catalytic felt, the fibers acting as the binding agent. The resulting material has a weight of 900 g/m2, a permeability between 15 and 30 l/dm2/min at 12 mm of water gauge and is pleatable at room temperature.

It is to be understood that above example is given for illustrative purposes only. Alternate embodiments can be realized. For instance, thicker or thinner fabrics can be realized using more or less spunlaced PTFE, and different E-PTFE membranes. The pleatable metallic scrim can be applied to materials other than PTFE. Further, other scrim materials than metals can have similar pleatability and resistance characteristics. The use of a catalyst is optional. Given the above, the scope is indicated by the appended claims.

What is claimed is:

1. A pleatable filtration material comprising a felt having spunlaced PTFE fibers on a pleatable metallic scrim having a weight between 100 and 1000 g/m², the felt having a density between 150 and 1000 g/m²; and a membrane laminated onto the felt, made of E-PTFE and having a permeability to air of between 3 and 75 l/dm²/minute at 12 mm of water gauge; wherein the filtration material can be pleated at room temperature and thenceforth operably retain its pleats.

2. The pleatable filtration material of claim 1 further comprising particles of catalyst having a size of less than 10 microns, at least one of present on the surface of the PTFE fibers and embedded into the PTFE fibers.

3. The pleatable filtration material of claim 2 wherein the particles of catalyst are selected from the group consisting of titanium dioxide, iron oxide, zeolith, copper oxide, tungsten oxide, aluminum oxide, cobalt oxide, nickel oxide, chromium oxide, palladium, nickel, gold, platinum, silver and rhodium.

4. The pleatable filtration material of claim 1 wherein the membrane has a permeability to air of between 12 and 50 l/dm²/minute at 12 mm of water gauge.

5. The pleatable filtration material of claim 1 wherein the membrane is laminated directly onto the felt.

6. The pleatable filtration material of claim 1 wherein the membrane is laminated onto the felt via a binder which has resistance characteristics at least comparable to that of the PTFE fibers.

7. The pleatable filtration material of claim 6 wherein the binder is fluorinated ethylene propylene copolymer (FEP) or a hexafluoropropylene-tetrafluorethylene copolymer.

8. The pleatable filtration material of claim 1 wherein the metal scrim has chemical and thermal resistance characteristics at least comparable to PTFE fibers.

9. A process of making a pleatable filtration material having a weight between 100 and 1000 g/m² comprising felting PTFE fibers onto a pleatable metallic scrim until a felt density between 150 and 1000 g/m² in addition to the density of the scrim is reached; and laminating an E-PTFE membrane having a permeability to air of between 3 and 75 l/dm²/minute at 12 mm of water gauge onto a face of the felted PTFE fibers.

10. The process of claim 9 wherein the step of felting is done by hydro-entanglement.

11. The process of claim 9, wherein the laminating further comprises applying a binder in liquid suspension in a solvent onto the face of the felted PTFE fibers, and subsequently evaporating the solvent, the relative weight of transferred solid binder being between about 1% and 10%.

12. The process of claim 9, wherein the laminating is done directly onto the face of the felted PTFE fibers.

13. The process of claim 9 further comprising pleating the filtration material at room temperature.

14. A pleated filter bag for use in a bag house dust collector, the filter bag being elongated and comprising a longitudinal hollow center with an open end, and a pleated filter wall circumscribing the hollow center, the pleated filter wall having a spunlaced felt on an apertured and pleatable scrim and having a permeability appropriate for filtration, and a membrane having a permeability to air lower than the permeability to air of the felt and covering the felt on the outer side thereof facing the hollow center, wherein all of the scrim, the felt, and the membrane are resistant to a harsh filtration environment of the dust collector.

15. The filter bag of claim 14 wherein the scrim is made of metal.

16. The filter bag of claim 14 wherein the felt has PTFE fibers and the membrane is made of E-PTFE.

17. The pleatable filtration material of claim 16 wherein particles of catalyst are at least one of present on the surface of the PTFE fibers and embedded into the PTFE fibers.

* * * * *